United States Patent [19]
Zornow

[11] Patent Number: 5,393,104
[45] Date of Patent: * Feb. 28, 1995

[54] SANITARY HOSE COUPLER

[76] Inventor: Jeffrey S. Zornow, 9151 Normandy La., Centerville, Ohio 45458

[ * ] Notice: The portion of the term of this patent subsequent to Aug. 31, 2010 has been disclaimed.

[21] Appl. No.: 184,644

[22] Filed: Jan. 21, 1994

[51] Int. Cl.$^6$ ............................................. F16L 35/00
[52] U.S. Cl. ......................................... 285/40; 285/92; 285/93; 285/175; 285/251; 285/328; 285/258
[58] Field of Search ............... 285/256, 254, 258, 247, 285/40, 92, 93, 175, 251

[56] References Cited

U.S. PATENT DOCUMENTS

| 2,371,971 | 3/1945 | Main et al. | 285/259 |
| 2,481,001 | 9/1949 | Burckle | 285/259 X |
| 2,648,549 | 8/1953 | Woodward | 285/258 |
| 4,150,466 | 4/1979 | Horvath | 285/256 X |
| 4,850,620 | 7/1989 | Puls | 285/258 X |
| 4,893,848 | 1/1990 | McIcher | 285/259 X |
| 4,915,426 | 4/1990 | Skipper | 285/286 |
| 4,935,444 | 4/1988 | Skipper | 285/286 |
| 5,172,943 | 12/1992 | Shimada | 285/323 |
| 5,240,291 | 8/1993 | Zornow | 285/251 X |
| 5,317,799 | 6/1994 | Chapman et al. | 285/259 X |

FOREIGN PATENT DOCUMENTS 1136935  5/1957  France ................................ 285/259

Primary Examiner—Dave W. Arola
Attorney, Agent, or Firm—R. William Graham

[57] ABSTRACT

The present invention is directed to a coupling for use with sanitary hose, including a hollow female coupler piece and a hollow male coupler piece, wherein the male coupler piece is threadedly connected into the female coupler piece, and wherein a first end of the male coupler piece extends into a first end of the female coupler piece such that opposing surfaces of the first ends are radially spaced, and wherein one of the surfaces of the first ends includes a plurality of raised pad surfaces of a predetermined geometric design.

11 Claims, 2 Drawing Sheets

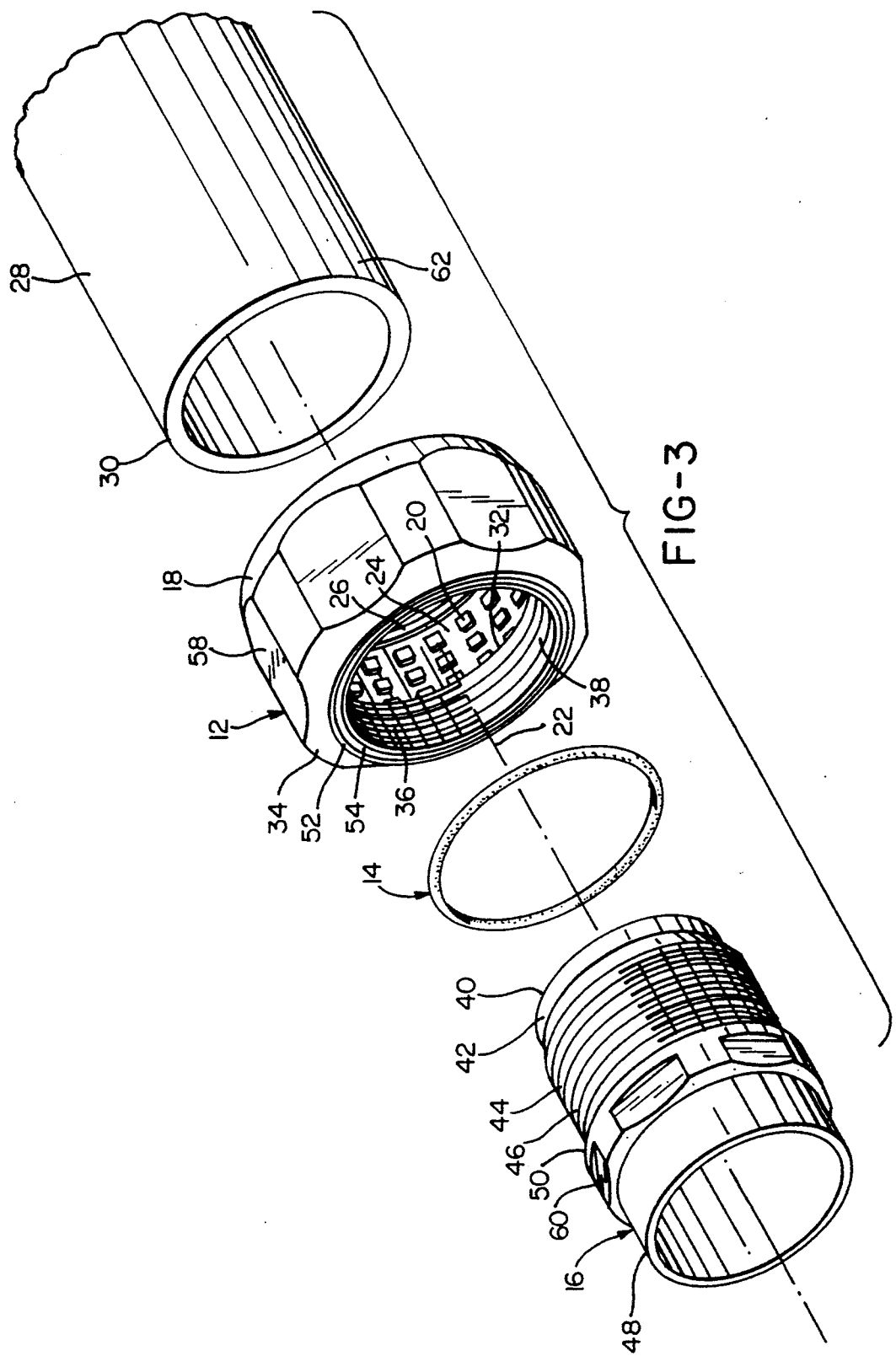

SANITARY HOSE COUPLER

BACKGROUND OF THE INVENTION

This invention relates to a hose coupler and, more particularly, to an improved coupler for attachment to a non-metallic flexible polymer hose to provide a sealed conduit which is not susceptible to bacteria or other contaminants at the coupler connection. In the area of consumable bulk liquids, such as milk, consumable bulk powders and granular materials, such as dry powder milk, there exist many types of hoses, wherein a particular hose has been found to be better suited for transport of one particular material than another hose. For example, rubber hose can be more desirable than non-metallic polymer for the flow property of a particular material and vice-a-versa.

Previously, the industry has relied upon permanent coupler attachment to the hose for sanitary transportation of bulk product. Such designs have included a steel barbed coupler attached with compression straps. Alternatively, the hose was vulcanized at the coupler/hose interface. If the hose was damaged, the entire unit had to be discarded.

More recently, there has been the exploration of employing a reusable coupling for sanitary transportation. One coupling includes a male and female piece which are threaded together at one end and radially spaced from one another at another end to receive an end of the hose therebetween. Heretofore, at least one of the opposing faces of the radially spaced surfaces of the ends of the coupling had a standard continuous barb thread which was used to hold the end of the hose in place. While this seemed to be effective for retaining rubber hose, for example, it was not effective for retaining flexible non-metallic polymer hose. Specifically, the polymer hose was found to spin or rotate between the opposing surfaces preventing stationary seal. Additionally, typical barb-like threads affect the integrity of the polymer hose.

At the present time there is a need for a coupling which is able to effectively grip and maintain a flexible nonmetallic polymer hose. Additionally, there is a need for a reusable coupling for flexible non-metallic polymer hose which provides a substantially sanitary seal. There is a need for minimizing the exposure of such bulk liquids, powders and granular materials to bacteria or other contaminants. In addition, there is a need for a coupler which provides a sanitary seal at flexible non-metallic polymer hose ends when assembled, and which can be readily assembled and disassembled.

SUMMARY OF INVENTION

It is an object of the present invention to provide a coupler for a flexible non-metallic polymer hose which provides an improved sanitary seal when assembled.

It is another object of the present invention to provide an improved coupler which is readily assembled and disassembled from an unthreaded flexible hose with minimal detrimental effect to the hose.

It is yet another object of the present invention to provide an improved sanitary coupler which is reusable.

It is still another object of the present invention to provide a coupler with a visible sanitary seal, to allow easy inspection without disassembling the coupler.

The present invention is directed to a coupling for use with sanitary hose, including a hollow female coupler piece and a hollow male coupler piece, wherein the male coupler piece is threadedly connected into the female coupler piece, and wherein a first end of the male coupler piece extends into a first end of the female coupler piece such that opposing surfaces of the first ends are radially spaced, and wherein one of the surfaces of the first ends includes a plurality of raised pad surfaces of a predetermined geometric design.

In the preferred embodiment, the female coupler piece has a plurality of raised generally rectangular pad surface portions located about the inner surface of the first end which extend radially inwardly. The distance between substantially diametrically opposing pad surfaces is substantially the diameter that of an outer surface of the hose. The first end of the male coupler piece is characterized such that a portion of the outer surface is of a size diameter greater than an inner surface diameter of the hose to force the hose radially outwardly against the pads of the female coupler piece when the coupling is assembled such that a portion of the outer surface of the hose is slightly deformed filling recessed surfaces adjacent the pad surfaces. The unique raised pad surface design of the female coupler piece, when the coupling is assembled, forms serpentine seal to the inside of the hose and inhibits both axial and rotational movement of the polymer hose. The coupler is further characterized as having a seal at an interface between the female coupler piece and male coupler piece to provide a sanitary seal and which permits visual inspection of its sealed condition.

Accordingly, an embodiment of the present invention is directed to a reusable coupling particularly well suited for sanitary use with a flexible non-metallic polymer hose comprising a female piece having a first end and a second end, the first end having a plurality of generally radially inwardly extending surfaces and recessed surfaces, the inwardly extending surfaces defining an opening therein to receive an end of the hose, the second end having an inner threaded surface defining an opening adjacent and coaxial with the opening of first end to form a passageway along a central axis of the female piece allowing communication though the female piece.

The coupler further includes a hollow male piece having a first end and a second end. The first end has a portion of its outer surface which is threaded in a complementary manner to the threaded opening of the second end of the female piece to allow receipt of the male piece therein. The second end of the male piece has a radially outwardly extending shoulder. The coupling also includes means for sealing between the shoulder and the second end of the female piece when the male piece is threadedly connected to the female piece. The means for sealing includes an O-ring. The second end of the female piece terminates in a collar with an annular groove defined therein to receive the O-ring.

The first end of the male piece has a portion of its outer surface diameter slightly greater than an inner surface diameter of the hose to cause the hose to radially expand when inserted therein. Thus, when the coupling is assembled, the hose is locked in place between an outer surface of the first end of the male piece and an inner surface of the first end of the female piece by virtue of the outer surface of the hose conforming to the extended and recessed inner surfaces of the first end of the female piece.

BRIEF DESCRIPTION OF THE DRAWINGS

FIG. 3 is an exploded perspective view of the coupler embodying the invention.

DETAILED DESCRIPTION OF THE PREFERRED EMBODIMENT

Figure 1:
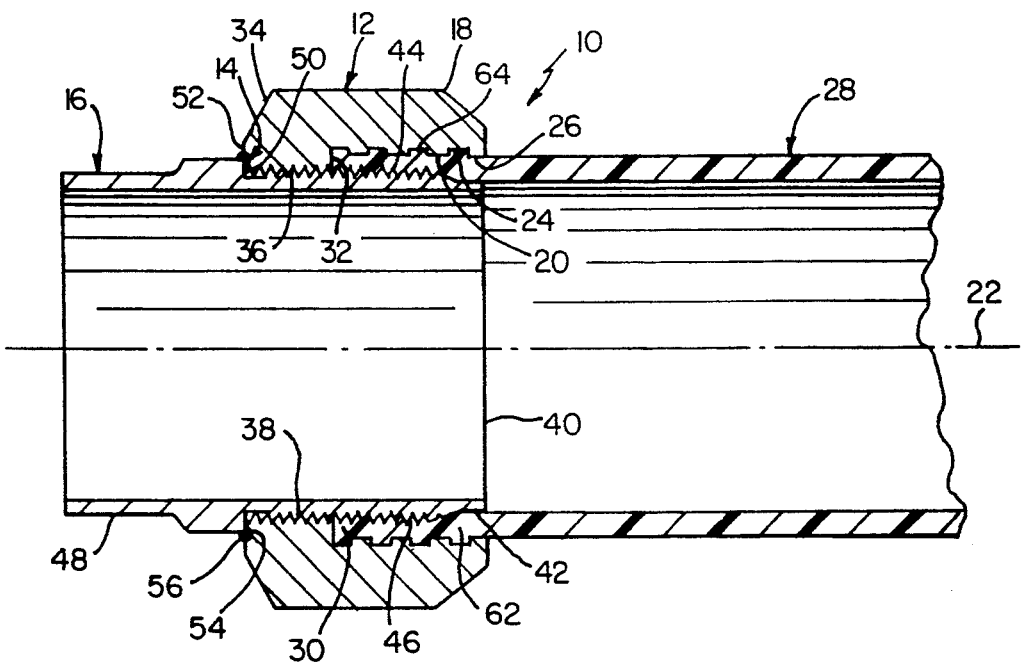
FIG. 1 is an assembled central longitudinal section through the coupler.

Referring to the drawings, a sanitary coupler 10 is provided with a generally cylindrical female piece 12, an O-ring 14, and a male piece 16. FIG. 1 shows the coupler in its assembled state, whereas FIG. 2 and FIG. 3 shows each of the pieces in an separated state.

Figure 2:
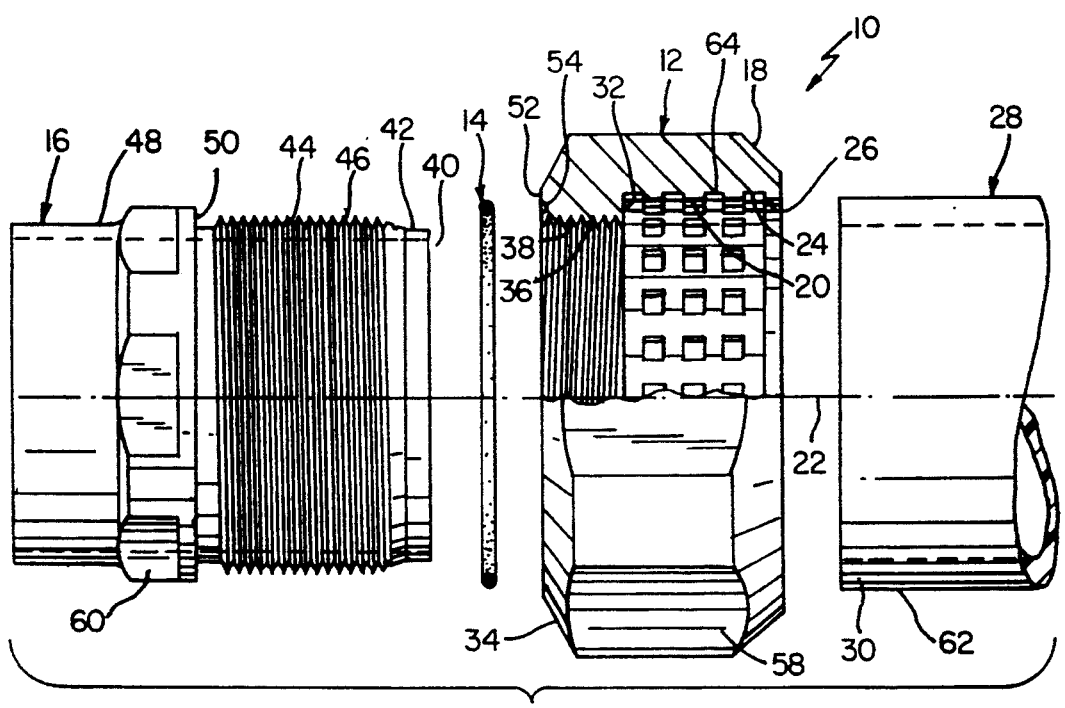
FIG. 2 is an exploded side view of the coupler embodying the invention.

As best seen in FIG. 2, the female piece 12 has within a first end 18 a novel feature which includes surfaces 20 which extend radially inwardly toward a central axis 22. The surfaces 20 are of a generally rectangular configuration by design, but could take on a number of other geometrical designs to achieve their purpose. Additionally, as part of the novel coupler 10 configuration, there is formed a generally continuous recessed surface 24 in the first end 18 of the female piece 12. The surfaces 20 and 24 of first end 18 generally define an opening 26 which is to receive an end of an unthreaded flexible non-metallic polymer hose 28 or the like, used for sanitary transport of product. The surfaces 20 extend radially inwardly such that the distance between substantially diametrically opposed surfaces 20 is substantially equal to the outer diameter of the hose 28. The surfaces 20 and 24 are formed in a configuration to prevent the hose 28 from spinning, rotating out of, or axially moving out of the female piece 12 when assembling the female piece 12 and the male piece 16.

The female piece 12 is forcibly insertable onto end 30 of the hose 28 such that the hose end 30 abuts a ledge 32. Within the second end 34 of the cylindrical female piece 12 is a threaded surface 36 which forms an opening 38 for receiving first end 40 of male piece 16 therethrough. Openings 26 and 38 form a stepped passageway along the axis 22 and which allows for communication through female piece 12.

The first end 40 of male piece 16 is preferably tapered having a portion 42 of slightly less diameter that the inner diameter of the hose 28 and a portion 44 of slightly larger diameter than the inner diameter of the hose 28. The tapered design of the first end 40 allows for easy acceptance and positioning of the male piece into the inner diameter of the hose 28 while providing radially outward pressure on the inner surface of the hose 28 to lend to the locking advantage described below.

The portion 44 has an external threaded surface 46 formed in a complementary manner to threaded surface 36 of female piece 12 allowing threaded connection thereof. Disposed adjacent to the threaded surface 46 and on the second end 48 is a radially extending shoulder 50. The second end 48 is formed in a manner to be readily connected to a fixture used in the sanitary equipment industry. For example, a standard sanitary end, e.g. Tri-Clamp ® by Laddish Co., Wis. or I-Line TM and Q-Line by Cherry Burrell, Iowa, may be welded, brazed, or soldered to second end 48. The assembly is then ready to be connected to sanitary equipment like receiving pumps, processing equipment, storage vats, transport trucks, etc.

The end 34 of female piece 12 includes a radial collar 52 which has an annular groove 54. The annular groove 54 is shaped to seat a portion of the O-Ring 14.

In the assembled form as shown in FIG. 1, the shoulder 50 compresses the O-ring 14 against the collar 52. This results in a seal which leaves a small portion 56 of the O-ring 14 protrudingly exposed to provide the benefit of inspectability and prevent bacteria or other contaminants from entering at the junction between female piece 12 and male piece 16. The present invention finds itself particularly well-suited for use in transferring products which must remain substantially sanitary. It will be readily apparent to those skilled in the art that the coupler of the present invention can be made in a variety of sizes to accommodate a number of flexible non-metallic hoses from a number of manufacturers e.g. Series 210 HFG; 212 MK by Kanaflex, Wheeling, Ill.; Tigerflex by Kuriama, Elkgrove, Ill.; Spiralite Series #170, Torrance, Calif. The piece 12 and piece 16 have wrench flats 58 and 60, respectively to enable gripping thereof for assembly. The coupler is assembled as follows.

Female piece 12 is forcibly pressed onto the hose end 30. The hose 28 is in the correct position when it bottoms out on ledge 32. Upon the complete insertion of the first end 40 of the male piece 16 into the hose 28, a portion 62 of the outer surface of the hose 28 is forced into the contiguous groove surface 64 formed between surfaces 20 and 24 resulting in a series of slight deformations of the outer surface of the hose 28. The first end 40 not only forces the hose against the surfaces 20 and 24, but also creates a first sealing interface between the female piece 12 and the outer diameter of the hose wall. This results in locking the hose 28 within the female piece 12 with the outer surface of the hose having a serpentine like seal with the inner surface of piece 12.

Prior to the insertion of male piece 16, the O-ring 14 is placed in the annular groove 54 and maintained therein. Female piece 12 is positioned to receive the first end 40 of the male piece in the opening 38. Male piece 16 is rotated to be threadedly drawn into female piece 12. As male piece 16 and the hose 28 is threaded into female piece 12 the shoulder 50 nears and ultimately abuts the O-ring 14. At this point, it is found desirable to further thread male piece 16 into female piece 12 until sufficient resistance builds at the interface between the shoulder 50, O-ring 14 and collar 54 to substantially secure male piece 16 in place and prevent rotation and axial movement of male piece 16 with respect to female piece 12.

This further threading results in a slight bulging of the O-ring 14 constituting the portion 56. The juncture formed by the interconnection of the shoulder 50, O-ring 14, and collar 52 is found to provide a highly suitable and improved seal against not only leakage out, but also bacteria and contaminants in. The novel sealing and locking mechanisms described above therefore provide the coupling with the unique capability of sanitary transfer of product.

While a preferred embodiment has been set forth above, it is intended only to present the invention in an embodiment. It will be readily apparent to those skilled in the art that many obvious modifications, derivations, and improvements exist and are intended to be included within the scope of the invention and appended claims hereto.

What is claimed is:

1. A coupler for flexible nonmetallic polymer hose which is particularly well suited for sanitary use, comprising:

a female piece having a first end and a second end, said first end having a plurality of generally radially inwardly extending surfaces and a surrounding continuous recessed surface, said inwardly extending surfaces and said recessed surface defining an opening therein to receive an end of said hose, said second end having an inner threaded surface defining an opening adjacent and coaxial with said opening of said first end to form a passageway along a central axis of said female piece allowing communication through said female piece;

a hollow male piece having a first end and a second end, said first end having a portion of an outer surface which is threaded in a complementary manner to said threaded opening of said second end of said female piece to allow receipt of said male piece therein and having a portion of said outer surface of a size diameter greater than an inner surface diameter of said hose to force the hose radially outwardly against said inner surfaces of said first end of said female coupler piece when said coupling is assembled such that a portion of an outer surface of said hose is slightly deformed filling areas adjacent said inner surfaces of said first end of said female piece to prevent both axial and rotational movement of the polymer hose, said male piece further including a shoulder between said first end and said second end of said male piece; and means for sealing between said shoulder and said second end of said female piece when said male piece is threadedly connected to said female piece wherein said sealing means remains partially visible when connected and wherein said sealing means acts to aid in securing said male piece in place and prevent rotation and axial movement thereof with respect to said female piece while being visible to confirm the integrity of said sealing means.

2. The coupler of claim 1, wherein said radially inwardly extending surfaces are of a rectangular configuration.

3. The coupler of claim 1, wherein said first end of said male piece is tapered having a portion furthest displaced from said second end of slightly less diameter than an inner diameter of the hose.

4. The coupler of claim 1, wherein said second end of said female piece terminates in a collar with an annular grooved surface therein and said means for sealing includes an O-ring disposable within said grooved surface, wherein a seal is formed by compressing said O-ring in said annular grooved surface in a manner which forces a portion thereof to seat in said annular grooved surface between said second end of said female piece and said shoulder of said male piece and forces another portion of said O-ring to protrude outwardly from said coupler in a visible manner.

5. A coupling for a flexible non-metallic polymer hose, comprising:

a generally cylindrical male piece having a passageway extending along its central axis, a first end having an externally threaded portion adjacent a shoulder, and a second end adapted for sanitary connection to fixtures used in the sanitary industry;

a generally cylindrical female piece adapted for cooperative connection with said male piece, said female male piece having a passageway extending along its central axis of greater diameter than said first end of said male piece to permit said first end of said male piece to pass therethrough, a first end of said female piece having an inner surface characterized by a plurality of generally inwardly extending surfaces and a surrounding recessed surface which define an opening to receive an end of the hose therein, and a second end of said female piece characterized such that said passageway is threaded for cooperative engagement with said externally threaded portion of said male piece; and means for sealing between said shoulder and said second end of said female piece when said male piece is threadedly connected to said female piece, wherein said sealing means remains partially visible when connected and wherein said sealing means acts to aid in securing said male piece in place and prevent rotation and axial movement thereof with respect to said female piece while being visible to confirm the integrity of said sealing means.

6. The coupling of claim 5, wherein said sealing means is further characterized by an annular grooved surface which is defined along said second end of said female piece and an O-ring disposably seated in said grooved surface wherein said O-ring, said shoulder and said second end of said female piece act to aid in securing said male piece in place and prevent rotation and axial movement of said male piece with respect to said female piece, said O-ring so positioned to absorb shock between said male piece and said female piece when said coupling is assembled, and wherein said O-ring is seated in said grooved surface in a manner which provides visual confirmation of seal integrity when said coupling is assembled.

7. The coupling of claim 6, wherein said first end of said male piece is of slightly smaller diameter at its termination point than along the rest of its length to facilitate insertion into the opening of a hose having its end residing in said passageway portion of said female piece second end, and said first end of said male piece generally of a diameter to force the hose outwardly against said pads surface portion of said first end of said female piece forming a seal at the interface thereof.

8. The coupler of claim 5, wherein said radially inwardly extending surfaces are of a rectangular configuration.

9. A coupler for a flexible non-metallic polymer hose having a predetermined inner diameter and outer diameter which is particularly well suited for sanitary use, comprising:

a female piece having a first end and a second end, said first end having a plurality of generally radially inwardly extending surfaces and a surrounding continuous recessed surface, said inwardly extending surfaces defining an opening slightly larger than said outer diameter of said hose to receive an end of said hose, said second end having an inner threaded surface defining an opening adjacent and coaxial with said opening of said first end to form a passageway along a central axis of said female piece allowing communication through said female piece; and a hollow male piece having a first end and a second end, said first end having a portion of an outer surface which is threaded in a complementary manner to said threaded opening of said second end of said female piece to allow receipt of said male piece therein and having a portion of said outer surface of a size diameter greater than an inner surface diameter of said hose to force the hose radially outwardly against said inwardly extending surfaces of said first end of said female coupler piece when said coupler is assembled such that a portion of said outer surface of said hose is slightly deformed filling areas adjacent said inwardly extending surfaces of said first end of said female piece to prevent both axial and rotational movement of said polymer hose with minimal damage to said hose, wherein said male piece further includes a shoulder between said first end and said second end of said male piece; and means for sealing between said shoulder and said second end of said female piece when said male piece is threadedly connected to said female piece wherein said sealing means remains partially visible when connected and acts to aid in securing said male piece in place and prevent rotation and axial movement thereof with respect to said female piece while being visible to confirm the integrity of said sealing means.

10. The coupler of claim 9, wherein said second end of said female piece terminates in a collar with an annular grooved surface therein and an O-ring disposed within said grooved surface, wherein a seal is formed by compressing said O-ring in said annular grooved surface between said second end of said female piece and said shoulder of said male piece and forces a portion of said O-ring to protrude outwardly from said coupler in a visible manner.

11. The coupler of claim 9, wherein said radially extending surfaces are further characterized to be of a generally rectangular pad configuration having a hose contacting surface designed to cause minimal damage to said hose when said coupler is assembled.

* * * * *